Jan. 5, 1965     S. GOLDBERG     3,164,781
OPTICAL MASER PUMPING SYSTEM
Filed March 7, 1962
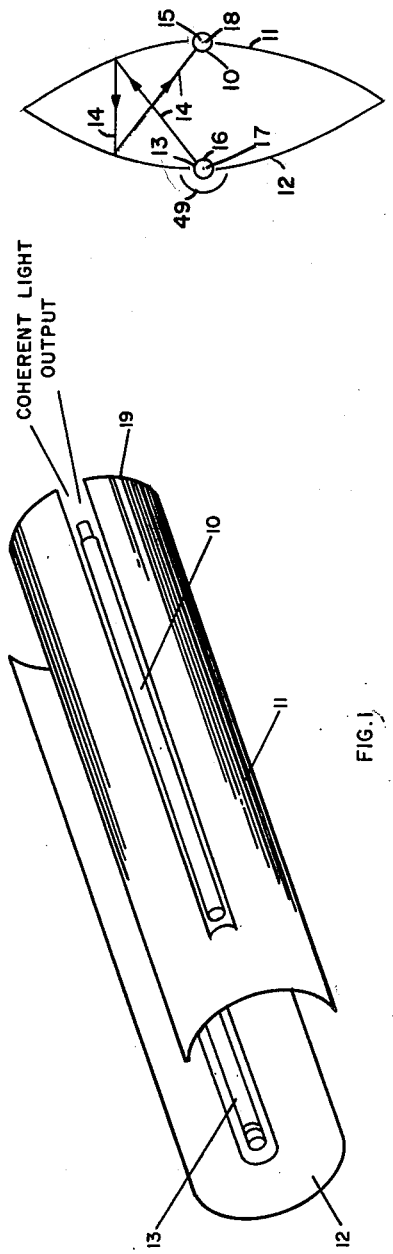
INVENTOR.
SEYMOUR GOLDBERG
ATTORNEYS 3,164,781
OPTICAL MASER PUMPING SYSTEM
Seymour Goldberg, Lexington, Mass., assignor to Edgerton, Germeshausen & Grier, Inc., Boston, Mass., a corporation of Massachusetts
Filed Mar. 7, 1962, Ser. No. 178,087
1 Claim. (Cl. 331—94.5)

This invention relates to apparatus for producing electromagnetic energy in the optical region directly from excited molecules or atoms, and has for its primary object the provision of an optical maser in which more of the available optical pumping energy is concentrated at the active medium more efficiently than has heretofore been possible. A concomitant object is the provision of an optical maser requiring a sharply reduced amount of optical energy due to more efficient utilization thereof.

The first optical maser utilized pink ruby as the solid active medium. Ruby is aluminum oxide in which a few of the aluminum atoms have been replaced by chromium atoms; the more chromium the deeper the color. A pale pink ruby, for instance, may contain about 0.05 percent chromium. For use in an optical maser, the ruby is machined into a rod about one-half centimeter in diameter and its ends are polished optically flat and parallel and are partially silvered. The rod is placed near an electronic flash tube that provides broad-band pumping light. The chromium atoms in the crystal absorb a broad band of light in the green blue region. The light that is absorbed raises the chromium atoms to various excited states from which they decay to a metastable state. In the decay to the metastable state they give up some of their energy as heat to the crystal lattice. If they are not subjected to stimulation, their stay at this metastable level lasts a few milliseconds until they drop at random to the ground state. Photons emitted during this final drop have a wavelength at room temperature of 6,943 angstrom units. In an optical maser, however, the first few photons released at this wavelength stimulate others of the still metastably excited chromium atoms to give up photons and tumble to the ground state much sooner than they would normally; the result is a cascade of photons at the 6,943 angstrom unit wavelength. Thus a light wave will be created that travels along the axis of the ruby rod and will grow by stimulated emission until it reaches a mirror surface at one end. There it will be reflected back into the active medium and growth will continue. Finally, a portion of the wave can escape through one of the semi-transparent ends, constituting the output of the optical maser.

It was first discovered that a powerful electronic flash lamp connected to a large power supply was required to raise most of the chromium atoms to the excited state. Up to a certain critical flash intensity, all that happened was that the ruby emitted a burst of its own typical red fluorescence spread over the usual decay period for the excited atoms. But, above this critical flash intensity, maser action occurred, and an intense red beam flashed out from the partially silvered ends of the rod. This showed that a sufficient excess of atoms had been pumped up to the exicited state to make up for losses within the ruby rod. More than 2,000 watt-seconds of energy had to be discharged through a helical electronic flash tube to provide sufficient optical pumping energy for maser action to occur.

Other materials than pale pink ruby may be used as the active medium. For example, deep red ruby, or samarium or uranium ions in a calcium flouride crystal, may be used. The wave lengths produced by these are 7,009 and 7,041; 7,080; and 25,000 angstrom units respectively. Such materials in rod form, having mirrored ends, will be described hereinafter as an active medium that can be optically excited to produce maser action.

In summary, the invention contemplates the use of a plurality of parabolic cylinders with appropriate focii and vertices being coincident, so that nearly all the optical power produced by one or more straight-line flashtubes is concentrated at the active medium. An electric discharge circuit is connected to be discharged through the one or more flashtubes.

The principles of the invention, as well as other objects and advantages thereof, will appear from the following description taken in conjunction with the accompanying drawings, in which:

FIGURE 1 is a perspective diagrammatic view of an assembly of two parabolic cylinders, having reflective concave surfaces, illustrating the basic principle of the invention;

FIGURE 2 is a plan view of the assembly of FIGURE 1;

FIGURE 3 is a plan view of a preferred embodiment of the invention; and

FIGURE 4 is a schematic diagram of an electric discharge system connected to the flashtubes of FIGURE 3.

FIGURES 1 and 2 illustrate the basic principle of the invention. Parabolic cylinders 11 and 12 are so arranged that the vertex 15 of parabolic cylinder 11 coincides with the focus 18 of parabolic cylinder 12, and the vertex 17 of parabolic cylinder 12 coincides with the focus 16 of parabolic cylinder 11. A slot is cut in parabolic cylinder 12 to receive straightline flashtube 13. A slot is cut in parabolic cylinder 11 to receive cylindrically-shaped solid medium 10 which can be optically excited to produce maser action. Note that the slot extends to edge 19 of parabolic cylinder 11 so that the coherent light produced may be directed at a target as desired. Reflector 49 has a circular cross section and is mounted behind flashtube 13 as illustrated.

In operation, an electric discharge circuit (not shown) discharges through flashtube 13 producing a brilliant flash of light. Since flashtube 13 is located at focus 16 of parabolic cylinder 11, a greater number of the light rays produced, such as light ray 14, will be reflected first by parabolic cylinder 11 and then by parabolic cylinder 12 into active medium 10 which is located at the focus 18 of parabolic cylinder 12. Note that cylindrical reflector 49 reflects light rays that are emitted in a direction away from active medium 10 back toward active medium 10 and through focus 16 to the reflecting surface of adjacent parabolic cylinder 11.

As heretofore explained, if the active medium 10 is ruby, its chromium atoms are raised to excited states by this optical pumping energy. As the excited atoms finally return to the ground state, photons are released within active medium 10 creating a light wave that travels back and forth between the semi-mirrored ends until growth is sufficient for a portion of the wave to escape, as coherent light.

Note that in this configuration it is relatively easy to remove the heat generated when flashtube 13 is flashed. Means such as a fan (not shown) may be utilized for this purpose.

It will be apparent that in the embodiment of FIGURES 1 and 2, approximately one-half of the surface of active medium 10 is subjected to optical pumping energy. Accordingly, the system of FIGURE 3 was devised, in which four parabolic cylinders, 40, 41, 42 and 43, having reflective concave surfaces, are utilized. Parabolic cylinders 41 and 42 are mounted back to back and have a common slot located at common vertex 45. Cylindrical active medium 10 is disposed in said slot. Parabolic cylinder 40 is located so that its vertex 44 coincides with focus, F41, of parabolic cylinder 41. Parabolic cylinder 40 has a slot at vertex 44 in which is mounted flashtube 20. Flashtube 20 has a cylindrical reflector 50 mounted as illustrated. Parabolic cylinder 43 is mounted so that its vertex 46 coincides with focus, F42, of parabolic cylinder 42. It will be appreciated that parabolic cylinders 40, 41, 42, and 43 must be the same focal length. Thus, focii, F40 and F43, of parabolic cylinders 40 and 43, respectively, will coincide with vertex 45 of parabolic cylinders 41 and 42. Flashtube 21 is located in a slot at vertex 46 of parabolic cylinder 43. It has a cylindrical reflector 51 mounted as illustrated. When flashtubes 20 and 21 are fired simultaneously, brilliant flashes of light are produced. Reflectors 50 and 51 reflect light rays that are emitted in a direction away from active medium 10 back toward active medium 10 and through focii F41 and F42 respectively to the reflecting urfaces of adjacent parabolic cylinders 41 and 42. Light rays, such as rays 55 and 56 will be reflected as illustrated to active medium 10, a much greater portion of the surface of which will be subjected to such optical pumping power. Again, if active medium 10 is ruby, its chromium atoms will be excited and return to the ground state releasing photons which produce coherent light as explained heretofore.

Flashtubes 20 and 21 may be flashed by any one of many well-known discharge circuits. Such a circuit is illustrated in FIGURE 4, comprising capacitor charging circuit 22 that charges discharge capacitors 25 and 26 through limiting impedances 23 and 24, respectively. Discharge capacitor 25 is connected across main elctrodes 30 and 31 of flashtube 20. Discharge capacitor 26 is connected across main electrodes 33 and 34 of flashtube 21.

One terminal of secondary winding 28 of trigger transformer 27 is connected to trigger electrodes 32 and 35 of flashtubes 20 and 21 respectively. The other terminal of secondary winding 28 is connected to ground as illustrated. One terminal of primary winding 29 of trigger transformer 27 is connected to ground and to a trigger input circuit, the details of which are not shown. The other terminal of primary winding 29 is also connected to said trigger input circuit.

In operation, capacitor charging circuit 22 is connected to a suitable power source and energized to charge discharge capacitors 25 and 26. When these are charged, the trigger input circuit may be energized to transmit a trigger pulse through primary winding 29 of trigger transformer 27. The high voltage secondary pulse appears at trigger electrodes 32 and 35 of flashtubes 20 and 21. The potential of trigger electrodes 32 and 35 with respect to main electrodes 31 and 34 respectively is sufficiently high to ionize some of the gas in each of flashtubes 20 and 21. This is sufficient for discharge capacitors 25 and 26 to discharge through flashtubes 20 and 21 respectively, producing brilliant flashes of light. The maser action that results has been explained above. Again, note that it is relatively easy to remove the heat generated when flashtubes 20 and 21 are flashed. Means such as fans (not shown) may be utilized for this purpose.

It will be appreciated that in FIGURES 1, 2, 3, and 4 mounting details have been omitted to simplify the explanation. These are not necessary because they are well known in the art.

It will be further apparent that the invention provides means for concentrating more of the available optical pumping energy at active medium 10 than has heretofore been possible by reason of the parabolic cylinder arrangement. Accordingly, it will be apparent that the amount of optical energy needed to produce maser action may be sharply reduced because of the more efficient utilization thereof. Many modifications obviously can be made in construction and arrangement within the scope of the invention as defined in the appended claim.

What is claimed is:

In an optical maser having a cylindrical solid medium that can be optically excited to produce maser action, two straight-line flashtubes for optically exciting said medium, and an electric discharge circuit for simultaneously flashing said flashtubes, the improved system for coupling the light output of said flashtubes to said medium, said system comprising:

a first parabolic cylinder
    having a focus, a reflective concave surface and a slot located at its vertex in which one of said flashtubes is mounted;

second and third parabolic cylinders
    each having reflective concave surfaces, disposed back to back, having a common vertex coincident with the focus of said first parabolic cylinder, and having a common slot located at said common vertex in which said medium is mounted;

a fourth parabolic cylinder
    having a reflective concave surface, a focus coincident with said common vertex of said second and third parabolic cylinders, and a slot located at its vertex in which the other of said flashtubes is mounted; and two cylindrical reflectors
    each mounted adjacent one of said flashtubes, one behind said first parabolic cylinder and the other behind said fourth parabolic cylinder, and disposed to reflect optical power through the slots of said first and fourth parabolic cylinders, respectively, toward said medium and through the focii of said second and third parabolic cylinders, respectively, toward the reflective surfaces thereof.

References Cited by the Examiner

UNITED STATES PATENTS

| 2,198,014 | 4/40 | Ott. | |
| 2,478,907 | 8/49 | Edgerton. | |
| 2,810,321 | 10/57 | Ulffers | 88—24 |
| 2,929,922 | 3/60 | Schawlow et al. | 88—1 |

FOREIGN PATENTS

| 591,964 | 2/60 | Canada. |
| 1,061,592 | 11/53 | France. |
| 501,294 | 7/30 | Germany. |
| 747,917 | 10/44 | Germany. |
| 856,196 | 11/52 | Germany. |
| 484,199 | 4/38 | Great Britain. |

OTHER REFERENCES

Fox et al.: "Resonant Modes Man Optical Maser", Proc. of the IRE, vol. 48, No. 11, November, 1960, pages 1904 and 1905.

Ciftan et al.: "A Ruby Laser With an Elliptic Configuration," Proceedings IRE, vol. 49, No. 5, May, 1961, pp. 960 and 961.

JEWELL H. PEDERSEN, *Primary Examiner*.